US012775839B1

(12) United States Patent
Zheng et al.

(10) Patent No.: US 12,775,839 B1
(45) Date of Patent: Oct. 27, 2026

(54) DISTRIBUTED ASYNCHRONOUS TRAINING OF MACHINE LEARNING MODELS FOR LARGE GRAPHS USING MULTIPLE RESOURCE TYPES

(71) Applicant: Amazon Technologies, Inc., Seattle, WA (US)

(72) Inventors: Da Zheng, Fremont, CA (US); Xiang Song, Los Altos, CA (US); Chengru Yang, Hefei (CN); George Karypis, Bloomington, MN (US)

(73) Assignee: Amazon Technologies, Inc., Seattle, WA (US)

( * ) Notice: Subject to any disclaimer, the term of this patent is extended or adjusted under 35 U.S.C. 154(b) by 1082 days.

(21) Appl. No.: 17/702,661

(22) Filed: Mar. 23, 2022

(51) Int. Cl.
*G06N 3/08* (2023.01)
*G06N 3/04* (2023.01)
*G06N 3/063* (2023.01)

(52) U.S. Cl.
CPC ................ *G06N 3/08* (2013.01); *G06N 3/04* (2013.01); *G06N 3/063* (2013.01)

(58) Field of Classification Search
CPC ........................................................ G06N 3/08
USPC ............................................................ 706/10
See application file for complete search history.

(56) References Cited

U.S. PATENT DOCUMENTS

2015/0220530 A1* 8/2015 Banadaki ................ G06F 16/90 707/723
2020/0302334 A1* 9/2020 Yang ...................... G06N 20/00
2021/0056348 A1* 2/2021 Berlin ...................... G06T 11/60
2021/0319324 A1* 10/2021 Mueller ................. G06N 3/063
2023/0101554 A1* 3/2023 Agrawal ............... G06F 9/5038 718/1

OTHER PUBLICATIONS

Peter W. Battaglia, et al., “Relational inductive biases, deep learning, and graph networks,” https://arxiv.org/abs/1806.01261, pp. 1-40.
Jianfei Chen, Jun Zhu, Le Song, “Stochastic Training of Graph Convolutional Networks with Variance Reduction,” Proceedings of the 35 th International Conference on Machine Learning, Stockholm, Sweden, PMLR vol. 80, 2018, pp. 1-9.
Jie Chen, Tengfei Ma, Cao Xiao, “FastGCN: Fast Learning with Graph Convolutional Networks via Importance Sampling,” Published as a conference paper at ICLR 2018, pp. 1-15 (https://arxiv.org/pdf/1801.10247.pdf), 2018.
(Continued)

*Primary Examiner* — Austin Hicks
(74) *Attorney, Agent, or Firm* — Robert C. Kowert; Kowert, Hood, Munyon, Rankin & Goetzel, P.C.

(57) ABSTRACT

An indication of a graph data set is obtained at a machine learning service. At a server identified for training a model using the graph data set, a plurality of mini-batch training iterations is conducted. A given mini-batch iteration comprises execution of a group of asynchronous tasks including a graph sampling task run at a CPU, and a model parameter learning task run at least in part at a training accelerator. At least one task of a given iteration is run in parallel with a task of another iteration. A trained version of the model is stored.

20 Claims, 11 Drawing Sheets

(56) References Cited

OTHER PUBLICATIONS

Wei-Lin Chiang, et al., "Cluster-GCN: An Efficient Algorithm for Training Deep and Large Graph Convolutional Networks," KDD '19: Proceedings of the 25th ACM SIGKDD International Conference on Knowledge Discovery & Data Mining, Jul. 2019, pp. 257-266, https://doi.org/10.1145/3292500.3330925.
David M. Dawson, "Lessons Learned from Porting LLNL Applications to Sierra," GTC 2019, pp. 1-39.
Matthias Fey, Jan Eric Lenssen, "Fast Graph Representation Learning with PyTorch Geometric," arXiv preprint https://arxiv.org/abs/1903.02428, Published as a workshop paper at ICLR 2019, pp. 1-9.
Swapnil Gandhi and Anand Padmanabha Iyer, Microsoft Research, "P3: Distributed Deep Graph Learning at Scale," Proceedings of the 15th USENIX Symposium on Operating Systems Design and Implementation, Jul. 14-16, 2021, pp. 1-19.
Justin Gilmer, Samuel S. Schoenholz, Patrick F. Riley, Oriol Vinyals, George E. Dahl, "Neural Message Passing for Quantum Chemistry," Proceedings of the 34th International Conference on Machine Learning, PMLR 70: pp. 1263-1272, 2017.
Joseph E. Gonzalez, Yucheng Low, Haijie Gu, and Danny Bickson, Carlos Guestrin, "PowerGraph: Distributed Graph-Parallel Computation on Natural Graphs," 10th USENIX Symposium on Operating Systems Design and Implementation (OSDI '12), pp. 17-30.
Will Hamilton, Zhitao Ying, Jure Leskovec, Inductive Representation Learning on Large Graphs, 31st Conference on Neural Information Processing Systems (NIPS 2017), pp. 1-11.
Weihua Hu, Matthias Fey, Hongyu Ren, Maho Nakata, Yuxiao Dong, Jure Leskovec, "OGB-LSC: A Large-Scale Challenge for Machine Learning on Graphs," 35th Conference on Neural Information Processing Systems (NeurIPS 2021), https://arxiv.org/abs/2103.09430, pp. 1-20, 2021.
Weihua Hu, Matthias Fey, Marinka Zitnik, Yuxiao Dong, Hongyu Ren, Bowen Liu, Michele Catasta, Jure Leskovec, "Open Graph Benchmark: Datasets for Machine Learning on Graphs," 34th Conference on Neural Information Processing Systems (NeurIPS 2020), pp. 1-16, 2020.
Wenbing Huang, Tong Zhang, Yu Rong, Junzhou Huang, "Adaptive Sampling Towards Fast Graph Representation Learning," 32nd Conference on Neural Information Processing Systems (NeurIPS 2018), pp. 1-10, 2018.
Zhihao Jia, Sina Lin, Mingyu Gao, Matei Zaharia, Alex Aiken, "Improving the Accuracy, Scalability, and Performance of Graph Neural Networks with Roc," Proceedings of the 3rd MLSys Conference, Austin, TX, USA, pp. 1-12, 2020.
George Karypis and Kirk Schloegel, "PARMETIS: Parallel Graph Partitioning and Sparse Matrix Ordering Library," Version 4.0, Technical Report, University of Minnesota, Department of Computer Science and Engineering, pp. 1-32, 2011.
George Karypis and Vipin Kumar, "A Fast and High Quality Multilevel Scheme for Partitioning Irregular Graphs," SIAM J. Sci. Comput., 20(1), pp. 359-392. (34 pages), 1998.
George Karypis and Vipin Kumar, "Multilevel Algorithms for Multi-Constraint Graph Partitioning," Proceedings of the 1998 ACM/IEEE Conference on Supercomputing, pp. 1-26, 1998.
Mu Li, et al, "Scaling Distributed Machine Learning with the Parameter Server," Proceedings of the 11th USENIX Symposium on Operating Systems Design and Implementation, USENIX Association, Oct. 6-8, 2014, pp. 1-17.
Zhiqi Lin et al., "PaGraph: Scaling GNN training on large graphs via computation-aware caching," Proceedings of the 11th ACM Symposium on Cloud Computing, Oct. 2020, pp. 401-415, https://doi.org/10.1145/3419111.3421281, 2020.
Lingxiao Ma and Zhi Yang, Youshan Miao, Jilong Xue, Ming Wu, Lidong Zhou, Yafei Dai, "NeuGraph: Parallel Deep Neural Network Computation on Large Graphs," Proceedings of the 2019 USENIX Annual Technical Conference, Jul. 10-12, 2019, pp. 1-16.
Grzegorz Malewicz, et al., "Pregel: a system for large-scale graph processing," Proceedings of the 2010 ACM SIGMOD International Conference on Management of data, Jun. 2010, pp. 135-146, https://doi.org/10.1145/1807167.1807184, 2010 pp. 1-11.
Vasimuddin Md, et al, "DistGNN: scalable distributed training for large-scale graph neural networks," Proceedings of the International Conference for High Performance Computing, Networking, Storage and Analysis, Nov. 2021 Article No. 76, pp. 1-14, https://doi.org/10.1145/3458817.3480856.
Michael Schlichtkrull, Thomas N. Kip, Peter Bloem, Rianne van den Berg, Ivan Titov, Max Welling, "Modeling Relational Data with Graph Convolutional Networks," CoRR, abs/1703.06103, 2017, pp. 1-9.
John Thorpe, et al., "Dorylus: Affordable, Scalable, and Accurate GNN Training with Distributed CPU Servers and Serverless Threads," Proceedings of the 15th USENIX Symposium on Operating Systems Design and Implementation. Jul. 14-16, 2021, pp. 1-21.
Alok Tripathy, Katherine Yelick; Aydn Buluç, "Reducing Communication in Graph Neural Network Training," https://arxiv.org/abs/2005.03300, 2020, pp. 1-13.
Petar Veličković, Guillem Cucurull, Arantxa Casanova, Adriana Romero, Pietro Liò, Yoshua Bengio, "Graph Attention Networks," https://arxiv.org/abs/1710.10903, Published as a conference paper at ICLR 2018, pp. 1-12.
Minjie Wang, Da Zheng, Zihao Ye, Quan Gan, Mufei Li, Xiang Song, Jinjing Zhou, Chao Ma, Lingfan Yu, Yu Gai, Tianjun Xiao, Tong He, George Karypis, Jinyang Li, Zheng Zhang, "Deep Graph Library: A Graph-Centric, Highly-Performant Package for Graph Neural Networks," arxiv.org/abs/1909.01315, pp. 1-18, 2020.
Dalong Zhang, Xin Huang, Ziqi Liu, Zhiyang Hu, Xianzheng Song, Zhibang Ge, Zhiqiang Zhang, Lin Wang, Jun Zhou, Yang Shuang, Yuan Qi, "AGL: a Scalable System for Industrial-purpose Graph Machine Learning," arxiv.org/abs/2003.02454, pp. 1-12, 2020.
Da Zheng, et al., "DistDGL: Distributed Graph Neural Network Training for Billion-Scale Graphs," arxiv.org/abs/2010.05337, pp. 1-9, 2021.
Xiaowei Zhu, Wenguang Chen, Weimin Zheng, Xiaosong Ma, "Gemini: A Computation-Centric Distributed Graph Processing System," e Proceedings of the 12th USENIX Symposium on Operating Systems Design and Implementation (OSDI '16). Nov. 2-4, 2016, pp. 1-17.
Difan Zou, Ziniu Hu, Yewen Wang, Song Jiang, Yizhou Sun, Quanquan Gu, "Layer-Dependent Importance Sampling for Training Deep and Large Graph Convolutional Network," 33rd Conference on Neural Information Processing Systems (NeurIPS 2019), arxiv:1911.07323, 2019, pp. 1-11.
Eric Lind, et al., "A performance comparison between CPU and GPU in TensorFlor", School of Electrical and Computer Science, Jun. 7, 2019, Retrieved from https://www.diva-portal.org/smash/get/diva2:1354858/FULLTEXT01.pdf, pp. 1-50.

* cited by examiner

Sampled sub-graph 304 for 2-layer GNN (for target node = 1)

Input graph 302

DISTRIBUTED ASYNCHRONOUS TRAINING OF MACHINE LEARNING MODELS FOR LARGE GRAPHS USING MULTIPLE RESOURCE TYPES

BACKGROUND

Machine-learned models and data-driven systems have been increasingly used to help make decisions in application domains such as financial services, healthcare, education, and human resources. These applications have provided benefits such as improved accuracy, increased productivity, and cost savings. This trend is the result of a confluence of factors, such as ubiquitous connectivity, the ability to collect, aggregate, and process large amounts of fine-grained data (including large graph data sets representing relationships among millions of entities), and improved access to increasingly sophisticated machine learning models that can analyze this data.

Figure 1:
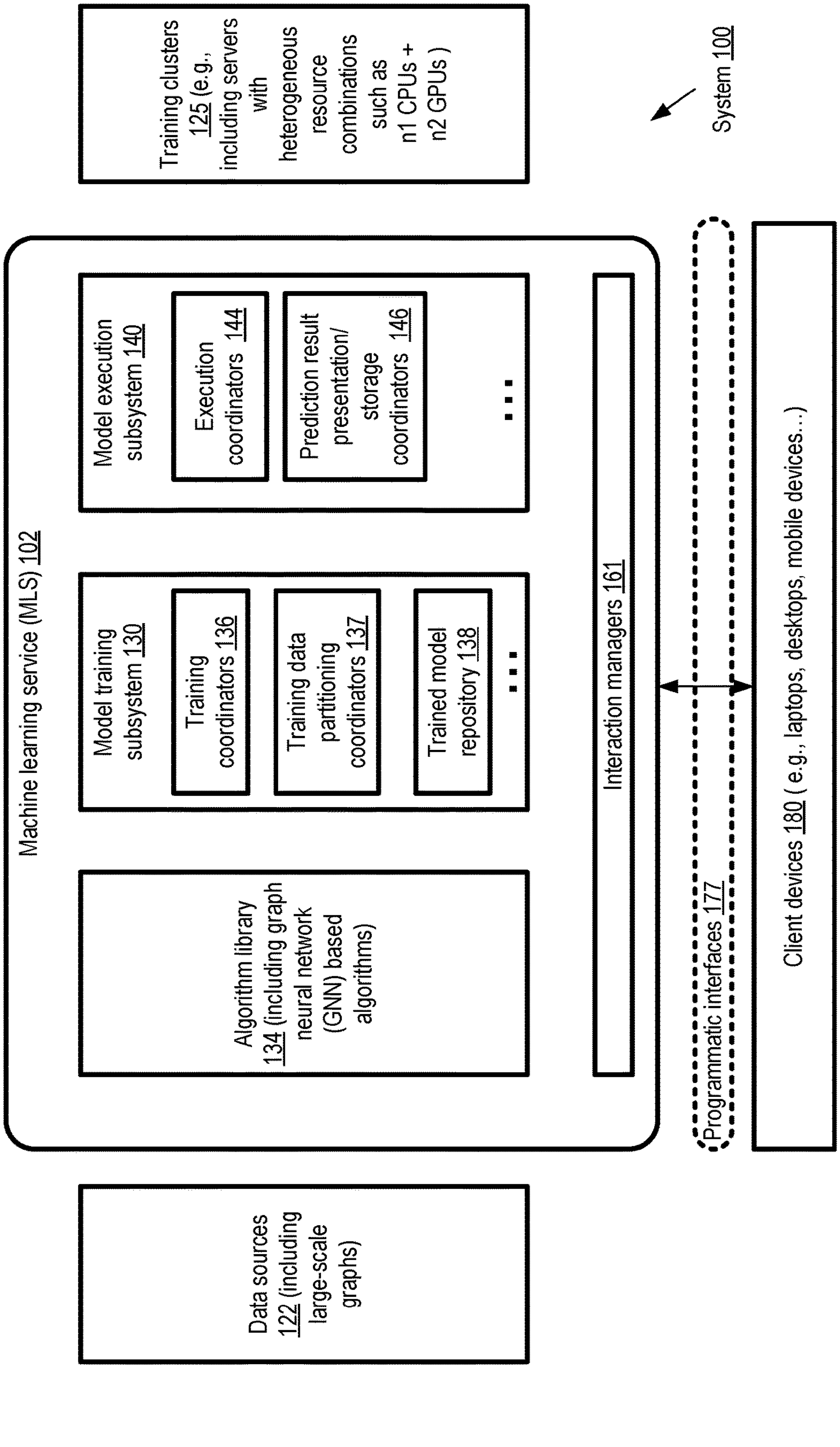
FIG. 1 illustrates an example system environment in which distributed asynchronous training of machine learning models for large graph data sets may be implemented using heterogeneous training resources, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for distributed asynchronous training of machine learning models for large graph data sets using heterogenous resource sets such as servers comprising a mix of CPUs (central processing units) and GPUs (graphics processing units). The techniques described herein can be implemented, for example, at a network-accessible machine learning service (MLS) of a provider network or cloud computing environment. A client may provide the service a data set to be used to prepare a machine learning model which can be trained iteratively using a mini-batch training methodology (such as a graph neural network-based or GNN model) for any of a variety of applications, such as a recommendation application, fraud detection, or search. The client may also provide an indication of a resource set that can be used for training the model. The data set may comprise millions or billions of nodes and edges of a graph, with the nodes representing entities and edges representing relationships between entities, and may in many cases be too large to be processed effectively at a single server. The resource set may comprise numerous servers interconnected via a network, with individual servers comprising one or more virtualized or physical CPUs and one or more virtualized or physical computing accelerators such as GPUs. Such GPUs and accelerators may be collectively referred to as training accelerators, as they may be well suited to perform at least a subset of computations used for training models very efficiently.

Given the information provided by the client, the service may distribute the data set among the servers of the resource set, such that individual ones of the servers store a respective subset or partition of the data set locally, with the partition contents being selected based on a variety of resource usage balance considerations. The service may then implement numerous asynchronous mini-batch pipelines in parallel at individual servers, with a given pipeline comprising several types of computation and data transfer tasks that can collectively exercise the available resources of different types (CPUs, accelerators/GPUs, networking resources etc.) to train the model as quickly as possible. As a result of the intelligent data distribution and asynchronous pipeline executions described herein, utilization of the available resources may be increased and high quality models may be obtained more rapidly. The proposed techniques may be scaled to graphs of arbitrary size, and to resource sets comprising various combinations of resource types (e.g., servers with CPUs/GPUs from different vendors, different types of network connectivity architectures, etc.). After the model has been trained, it may be stored and employed at the service to generate inferences for the targeted application, and the inferences may be presented to the client on whose behalf the model has been trained.

As one skilled in the art will appreciate in light of this disclosure, certain embodiments may be capable of achieving various advantages, including some or all of the following: (a) reducing the overall amount of time and computing resources used to train machine learning models for large graph-based data sets, e.g. by executing training sub-tasks in parallel at the different kinds of resources available and/or (b) improving the quality of the machine learning inferences generated for applications such as recommendations, fraud detection and search, by enabling larger graphs to be consumed as input for the machine learning models used for such applications.

According to some embodiments, a system may comprise one or more computing devices. The computing devices may include instructions that upon execution on or across the one or more computing devices obtain, at a machine learning service (MLS) of a provider network via one or more programmatic interfaces, an indication of (a) a resource set for training a model and (b) a data set of which at least a portion is to be used as training input for the model. The resource set may comprise a plurality of servers in various embodiments, wherein individual ones of the servers comprise one or more central processing units (CPUs) and one or more graphics processing units (GPUs) or other types of accelerators for machine learning tasks. The data set may comprise a graph with a plurality of nodes and a plurality of edges, with individual nodes representing respective entities (such as documents, individuals, machines, etc.), and an edge connecting a pair of nodes representing a logical relationship (e.g., a reference from one document to another, a social relationship between two individuals, connectivity between a pair of machines etc.) between the nodes of the pair. At a particular server of the plurality of servers, a first partition or subset of the data set may be stored in various embodiments. In at least some embodiments, the data set may be subdivided by applying a multi-constraint partitioning algorithm, with partition balance constraints or factors such as graph total-node-count balance, total-edge-count balance, labeled-node-count balance, labeled-edge-count balance, node-type balance, edge-type balance, and the like being taken into account. In addition to the nodes and edges, in at least some embodiments additional metadata or features associated with the entities and relationships represented in the data set partition may also be stored at the particular server. Respective partitions and associated features may also be identified and stored at other servers of the resource set in various embodiments.

At individual ones of the servers, a plurality of mini-batch training iterations of the model may be performed (e.g., at least partly in parallel) in various embodiments. For example, at the particular server, a plurality of mini-batch training iterations of the model using at least a portion of the first partition may be performed. A particular mini-batch training iteration of the plurality of mini-batch training iterations may for example comprise executing a group of asynchronous tasks including, among others, (a) a graph sampling task run at least in part on a CPU of the particular server, where the graph sampling task comprises sampling a subset of nodes of the first partition and (b) a model parameter learning task run at least in part on a GPU or accelerator of the particular server, where the model parameter learning task is performed using the subset of nodes sampled in the graph sampling task. In some embodiments, at least one asynchronous task of the particular mini-batch training iteration may be executed at least partly in parallel with an asynchronous task of another mini-batch iteration of the plurality of mini-batch iterations. After a trained version of the model is obtained (e.g., after respective sets of mini-batch training iterations are completed at the different servers, including the particular server), the trained version may be stored at the MLS in various embodiments. The trained version may be used to generate inferences of various kinds (e.g., node classifications, edge predictions, graph classifications, etc.) at the MLS, and indications of the inferences may be provided via MLS programmatic interfaces to the clients on whose behalf the trained model is executed to obtain the inferences.

In at least some embodiments, the provider network or cloud computing environment at which the MLS is implemented may include several other network-accessible services, such as a virtualized computing service, a storage service or the like. In one embodiment, the resource set used to train a model on behalf of an MLS client may include one or more compute instances or virtual machines of the virtualized computing service. A given compute instance may for example be run at a physical server comprising one or more CPUs and one or more GPUs or other types of hardware accelerators (e.g., machine learning training accelerators attached via peripheral interconnects in accordance with Peripheral Component Interconnect—Express or PCIe standards) in some cases, and the CPUs and accelerators may be utilized by programs run at the compute instance.

In addition to the graph sampling and model parameter computation tasks mentioned above, various other tasks may be performed as part of the asynchronous mini-batch training iterations in different embodiments, with some tasks being performed at CPUs, while other tasks are performed at least in part at accelerators such as GPUs. In at least some embodiments, the machine learning models trained using graph data sets may comprise graph neural networks (GNNs) with multiple layers. In one such embodiment, respective sampling tasks may be run for individual ones of the multiple layers as part of an asynchronous pipeline implemented for a given mini-batch, e.g., using CPUs. The asynchronous pipeline may also include feature copying tasks in some embodiments, for example including copying node and edge features from one type of memory (e.g., CPU or main memory, or local persistent storage) to a second type of memory (e.g., GPU memory or accelerator memory), so that the features can be accessed more quickly by the parameter computation or learning tasks performed at the accelerators. The asynchronous pipeline may include tasks comprising loading data needed by the accelerators (e.g., connectivity information of sampled nodes/edges) from CPU-accessible memory or storage to memory accessible by the accelerators in at least some embodiments. In one embodiment, a mini-batch training iteration may include a sub-graph compaction task, during which aliases are generated for one or more graph nodes. Such aliases may make it more efficient to access the nodes than the original identifiers assigned to the nodes—for example, the original identifiers may comprise very large integers for graphs which contain millions or billions of nodes, while the aliases may be smaller integers values chosen such that the maximum alias for a given sample is dependent only on the size of the sample or on the size of the partition from which the sample is selected. Other types of tasks may be included in the pipelines in some embodiments.

According to some embodiments, a client on whose behalf a model is to be trained may use programmatic interfaces of the MLS to provide values of various hyper-parameters for the training. Such hyperparameters may include, among others, a learning algorithm to be used for the model, a loss function, a number of layers of a neural network used for the model, a partitioning algorithm to be used to subdivide the data set into partitions, or a maximum number of mini-batch training iterations to be initiated in parallel at a given server of the resource set. In some embodiments, the MLS could use programmatic interfaces to provide various metrics collected during the training of the model, such as CPU utilization metrics of various servers used, training accelerator or GPU utilization metrics of various servers, and/or network bandwidth usage metrics indicative of traffic flowing between various servers used during training of the model. In at least one embodiment, a stochastic gradient descent algorithm may be used to train a model for which large graph data sets are used as input. In one embodiment, a synchronous stochastic gradient decent algorithm may be used, with a synchronization barrier after individual mini-batch iterations. Even though the algorithm may require synchronization barriers at the ends of the iterations, the work of the mini-batch iterations may nevertheless be split into asynchronous tasks as described above in such an embodiment, thereby enabling use of multiple resources concurrently for different mini-batches, leading to higher resource utilization and faster model convergence.

As mentioned above, in at least some embodiments an MLS may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or network-accessible services, which may include, in addition to an MLS, a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of virtualized central processing units (VCPUs or VCPU cores) and/or virtualized accelerator/GPUs, memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, accelerator, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. As mentioned above, the resource sets used by an MILS for training models may comprise compute instances in at least some embodiments.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. In some embodiments, software containers may be used to implement at least some tasks of the asynchronous pipelines for training graph-based models. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which distributed asynchronous training of machine learning models for large graph data sets may be implemented using heterogeneous training resources, according to at least some embodiments. As shown, system 100 may include resources and artifacts of a machine learning service (MLS) 102, including algorithm library 134, model training subsystem 130, model execution subsystem 140 and interaction managers 161 in the depicted embodiment, as well as data sources 122 and training clusters 125.

The MLS 102 may implement a set of programmatic interfaces 177, such as web-based consoles, command-line tools, application programming interfaces (APIs), graphical user interfaces and the like. Clients or users of the MLS 102 may submit various types of requests or messages via the programmatic interfaces 177 from a variety of client devices 180 (such as laptops, desktops, mobile computing devices and the like), and receive corresponding responses via the interfaces in the depicted embodiment. The requests may be processed initially by interaction managers 161, which may in turn transmit internal versions of the requests to other components of the MLS such as the model training subsystem 130 or the model execution subsystem 140. Responses to the clients' messages may be generated at the other components and sent to the client devices via the interaction managers in at least some embodiments.

An MLS client may use programmatic interfaces 177 to submit an indication of a data source 122 from which a data set comprising a large graph can be obtained and used to train model using a training algorithm from algorithm library 134 in the depicted embodiment. The training algorithm may, for example, comprise a GNN based algorithm for which training can be implemented in mini-batches in some embodiments. The graph may comprise numerous (e.g., millions or billions) of nodes and edges, with nodes representing entities and edges representing relationships between entities. In some cases, the graph may comprise more than one type of node (representing respective types of entities) and/or more than one type of edge (representing respective types of relationships among entities). In addition to information about the graph structure (i.e., identifiers of the nodes, indications of which other nodes are connected by edges to a given node, etc.), the data set may also comprise metadata pertaining to the nodes and edges (such as node types, edge types, properties of the entities and relationships represented, etc.) in at least some embodiments. Note that the MLS may be used to train and execute models of many different types in various embodiments, not just graph-based models, and the techniques described herein may represent a small subset of the MLS capabilities.

In some embodiments, the MLS client may also use programmatic interfaces 177 to specify a resource set to be used for training the model, e.g., comprising one or more training clusters 125. In one embodiment, for example, the client may specify one cluster of servers that can be used to partition the data set, and a second cluster of servers that can be used to then train the model. In some embodiments, the client may not necessarily specify the resource set. Instead, the client may specify the data set and the training algorithm to be used, and the MLS may select or recommend the set of resources to be used for partitioning the data set and training the model. In one embodiment, the client may specify constraints for training the model, such as a total resource budget and/or a total time budget, and the MLS may use this information to select the training clusters to be used. A given training cluster 125 may include one or more servers in some embodiments, with a given server comprising n1 CPUs and n2 GPUs (where n1>0, n2>=0 and n1 may or may not differ from n2 for a given server) or other accelerators. Note that in embodiments in which the training clusters comprise virtual machines, the CPUs and/or the GPUs/accelerators may be accessed via virtualization interfaces.

Model training subsystem 130 may comprise one or more training coordinators 136, one or more training data partitioning coordinators 137, and a trained model repository 138 in the depicted embodiment, each of which may be implemented using some combination of hardware and software of one or more computing devices. Model execution subsystem 140 may include execution coordinators 144 and prediction result presentation/storage coordinators 146, each of which may also be implemented using some combination of hardware and software of one or more computing devices.

After information about a data set and a resource set to be used for training a model is received, in at least some embodiments, training data partitioning coordinators 137 may implement a partitioning algorithm to split or subdivide the data set. Respective partitions of the data set may be identified, e.g., using a multi-constraint partitioning algorithm, and distributed for storage at local memories or storage devices of respective servers of the resource set. In some cases, as mentioned above, a number of balancing constraints or factors may be used to partition the data set, in an effort to ensure that the resources of the resource set are utilized evenly for the different partitions and data transfer requirements during the subsequent mini-batch training iterations are minimized as far as possible. The types of partition balance constraints considered may include, among others, a total-node-count-balance constraint (attempting to keep the total number of graph nodes balanced among partitions), a labeled-node-count-balance constraint (attempting to keep the total number of labeled graph nodes balanced among partitions, in scenarios in which some nodes are labeled while others are not), a node-type-balance constraint (attempting to keep the total number of graph nodes of a given type balanced among partitions, in scenarios in which the graph includes nodes of multiple types), a total-edge-count-balance constraint (attempting to keep the total number of graph edges balanced among partitions), an edge-type-balance constraint (attempting to keep the total number of graph edges of a given type balanced among partitions, in scenarios in which the graph includes edges of multiple types), and/or a labeled-edge-count-balance constraint (attempting to keep the total number of labeled graph edges balanced among partitions, in scenarios in which some edges are labeled while others are not). In at least one embodiment, a different cluster of servers (e.g., one comprising primarily CPUs) may be used to execute the partitioning algorithm than the cluster used later for the mini-batch training iterations (which may comprise servers with a higher GPU-to-CPU computing power ratio than the servers used for the partitioning algorithm).

A respective set of mini-batch iterations may be executed or performed at individual servers after respective partitions of the graph, as well as associated feature metadata, have been received and stored at the servers in various embodiments. As part of a given mini-batch training iteration, a pipeline or group of asynchronous tasks may be performed using the combination of CPUS and GPUs/accelerators available at a given server, with the tasks being orchestrated by a training coordinator 136 in various embodiments. Several different types of tasks may be performed as part of a pipeline, such as one or more graph mini-batch sampling tasks run on the local partition of the graph (e.g., one such sampling task per layer of the GNN being used for the model), feature copying tasks, GPU data loading tasks, sub-graph compaction tasks, model parameter computation and update tasks and the like, with each types of task being run on the type of resource (CPU or GPU/accelerator) which is most suited for that type of task. At least some tasks of a given pipeline for a given mini-batch may be performed in parallel with at least some tasks of a different pipeline for a different mini-batch in some embodiments.

After the mini-batch training iterations at all the servers being employed for the model are completed (i.e., after the model's predictions reach a desired quality threshold, or after the resource budget set aside for the training is exhausted), a trained version of the model may be stored, e.g., at trained model repository 138 of the MLS. The model may then be executed as and when desired by the client on whose behalf the model was trained, with the execution being orchestrated by an execution coordinator using one or more resources from training clusters 125 in the depicted embodiment. Inferences generated during the execution, such as node classifications, edge predictions and the like, may be provided to the client via programmatic interfaces 177 by prediction result presentation/storage coordinators 146 in some embodiments. Metrics collected during the training and/or execution (such as measured utilizations of CPUs, GPUs etc.) may be provided to the client via programmatic interfaces in at least one embodiment upon request or automatically. Clients may specify various hyperparameters for the training of the model via interfaces 177 in some embodiments, such as the algorithm (e.g., a stochastic gradient descent based algorithm) to be used for training, a loss function used during training, a number of layers of a neural network used for the model, a partitioning algorithm to be used to subdivide the data set into partitions, or a maximum number of mini-batch training iterations to be initiated in parallel at a given server of the training cluster.

Figure 2:
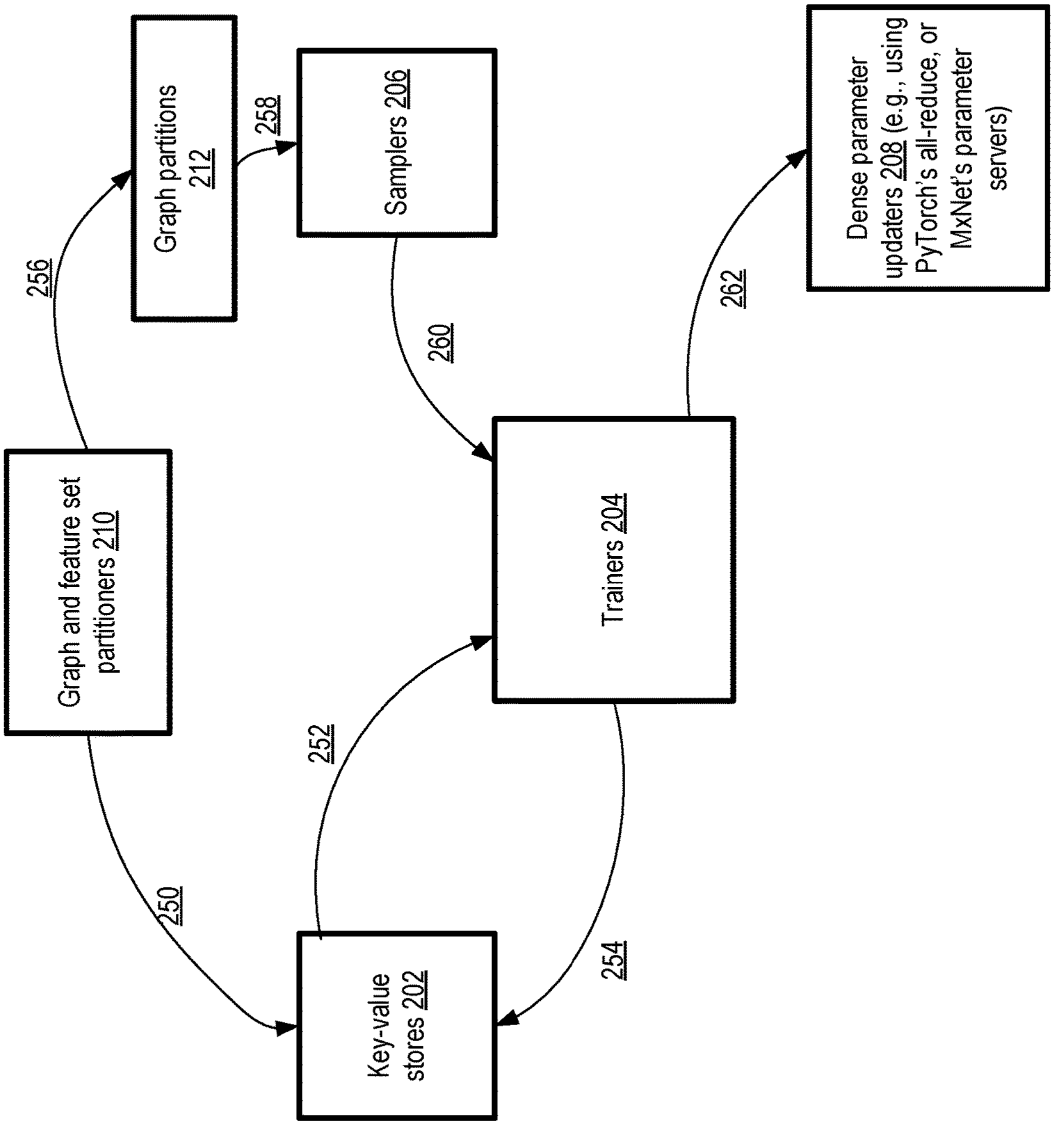
FIG. 2 illustrates an example software architecture for distributed asynchronous training of machine learning models for large graph data sets, according to at least some embodiments.

FIG. 2 illustrates an example software architecture for distributed asynchronous training of machine learning models for large graph data sets, according to at least some embodiments. As shown, the architecture may comprise graph and feature set partitioners 210, key-value stores 202, samplers 206, trainers 204, and dense parameter updates 208. The graph and feature set partitioners may subdivide the graph date sets into graph partitions 212 stored at respective training servers of a resource set, as indicated by arrow 256. Features of the nodes and/or edges of the graph corresponding to a given graph partition may be identified by the feature set partitioners and stored within a respective instance of a key-value store 202, as indicated by arrow 250. The instances of the key-value store may implement pull and push interfaces respectively for extracting the features and for updating sparse embeddings of sparse or local partition features in various embodiments. In some embodiments, if there are N servers in the resource set to be used for training a model, N graph partitions may be created, and N instances of key-value stores may be launched, with one graph partition and one key-value store instance created per server. In other embodiments, such 1-to-1 relationships between servers, key-value store instances and graph partitions may not be used; for example, two partitions and two instances of key-value stores may be incorporated at some servers which happen to have twice the computing capacity of other servers.

Respective sub-graphs of a graph partition to be used for mini-batches may be extracted for individual mini-batches by samplers 206 and provided to trainers 204 for iterative training of the model, as indicated by arrows 258 and 260 respectively. The mini-batch sampling computations may be split into many steps, with individual steps being performed asynchronously in a pipeline of tasks as discussed below in further detail. Features of the nodes and edges of a mini-batch may be extracted from the key-value store 202 (e.g., using pull interfaces implemented by the store) and used for the training in the depicted embodiment, as indicated by arrow 252. The training may involve forward and backwards propagation across the layers of a GNN in some embodiments.

During the training of some types of graph-based machine learning models such as GNNs, two types of parameters may be learned. Some parameters, which are shared across all nodes, may be updated in every mini-batch and referred to as dense parameters. Other parameters may comprise learned embeddings for individual graph nodes; only a subset of node embeddings may be updated in a given mini-batch, and such embeddings may be referred to as sparse parameters. New values for global or dense parameters may be aggregated and updated by dense parameter updaters 208, as indicated by arrow 262. The details of dense parameter updates may be dependent on the back-end machine learning framework or libraries being used; for example, if PyTorch is being used, the all-reduce primitive may be used, while if MXNet is being used, parameter servers implemented by MXNet may be employed. Updates to values of sparse parameters may be stored at the key-value store instance by the trainer, as indicated by arrow 254. Note that the logical architecture components shown in FIG. 2 may be mapped to execution resources (e.g., CPUs or GPUs) in different ways. For example, in some embodiments, as mentioned earlier, the graph and feature set partitioners 210 may be executed at a different set of resources than the resources used for mini-batch training iterations. In other embodiments, a given set of resources may be used for both partitioning and training.

In at least some embodiments, the models trained using large graphs may comprise FNNs as mentioned above. While many GNN frameworks are designed for full-batch training, in which the entire input graph is used for each training iteration, mini-batch training has been shown to be a more efficient approach, especially for large graphs. The time taken to converge on model parameters is sometimes an order of magnitude higher for full-batch training than for mini-batch training. In addition, the accuracy or quality of the predictions achieved using mini-batch training has been found to be superior to the accuracy or quality achieved using full-batch training for at least some test cases.

Figure 3:
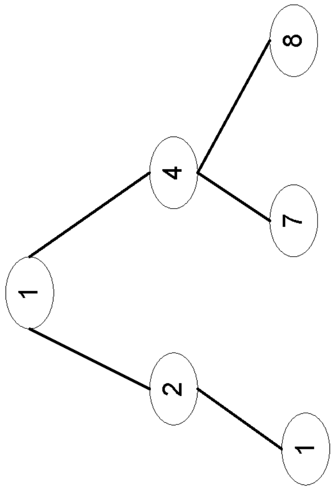
FIG. 3 illustrates a simple example of a sampled subgraph that may be created from an input graph for training a machine learning model, according to at least some embodiments.
Figure 3:
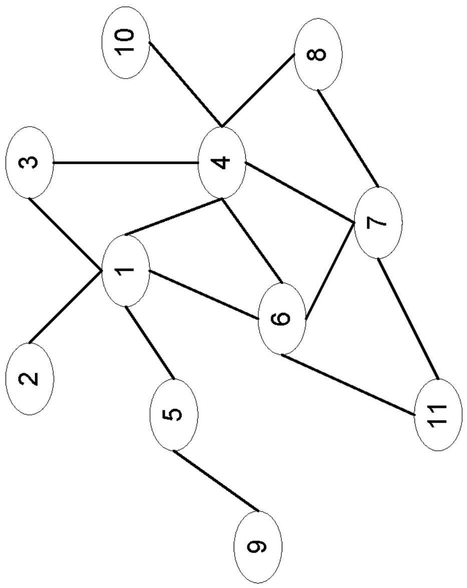

GNN mini-batch training differs from mini-batch training of other neural networks in that there is typically a data dependency between nodes of the graphs. Therefore, sub-graphs that capture the data dependencies have to be sampled or extracted to training GNN models. A typical strategy for sampling a mini-batch for a GNN model may include three types of steps: (a) sampling a set of N target nodes of the graph (or graph partition), e.g., uniformly at random from the available training data, (b) randomly picking at most K neighbor nodes of each target node, and (c) computing the target node representations by gathering messages from the sampled neighbors. If the GNN comprises multiple layers, the sampling is performed recursively—that is, for a given sampled neighbor node, additional neighbors are sampled. The number of recursions is determined by the number of layers in the GNN model. The sampling strategy forms a computation graph for passing messages on. FIG. 3 illustrates a simple example of a sampled sub-graph that may be created from an input graph for training a machine learning model, according to at least some embodiments. Input graph 302 comprises 11 nodes and 14 edges. In the depicted example scenario, a 2-layer GNN is used, and the value for the fanout parameter K (the maximum number of sampled neighbors) is set to 2. Sampled sub-graph 304 may be created with node 1 as the target node in the depicted embodiment. Corresponding to the first layer of the GNN, two neighbors of node 1 are chosen at random: nodes 2 and 4. Corresponding to the second layer of the GNN, up to 2 nodes are chosen from among the neighbors of the nodes 2 and 4. Since node 2 has a single neighbor (node 1), only node 1 is chosen in the second sampling step for node 2. Node 4 has 5 neighbors, from which nodes 7 and 8 may be selected as shown. A sampled sub-graph such as sub-graph 304, along with the corresponding node and edge features, represents the subset of the input data that constitutes a mini-batch used for one iteration of mini-batch training.

Figure 4:
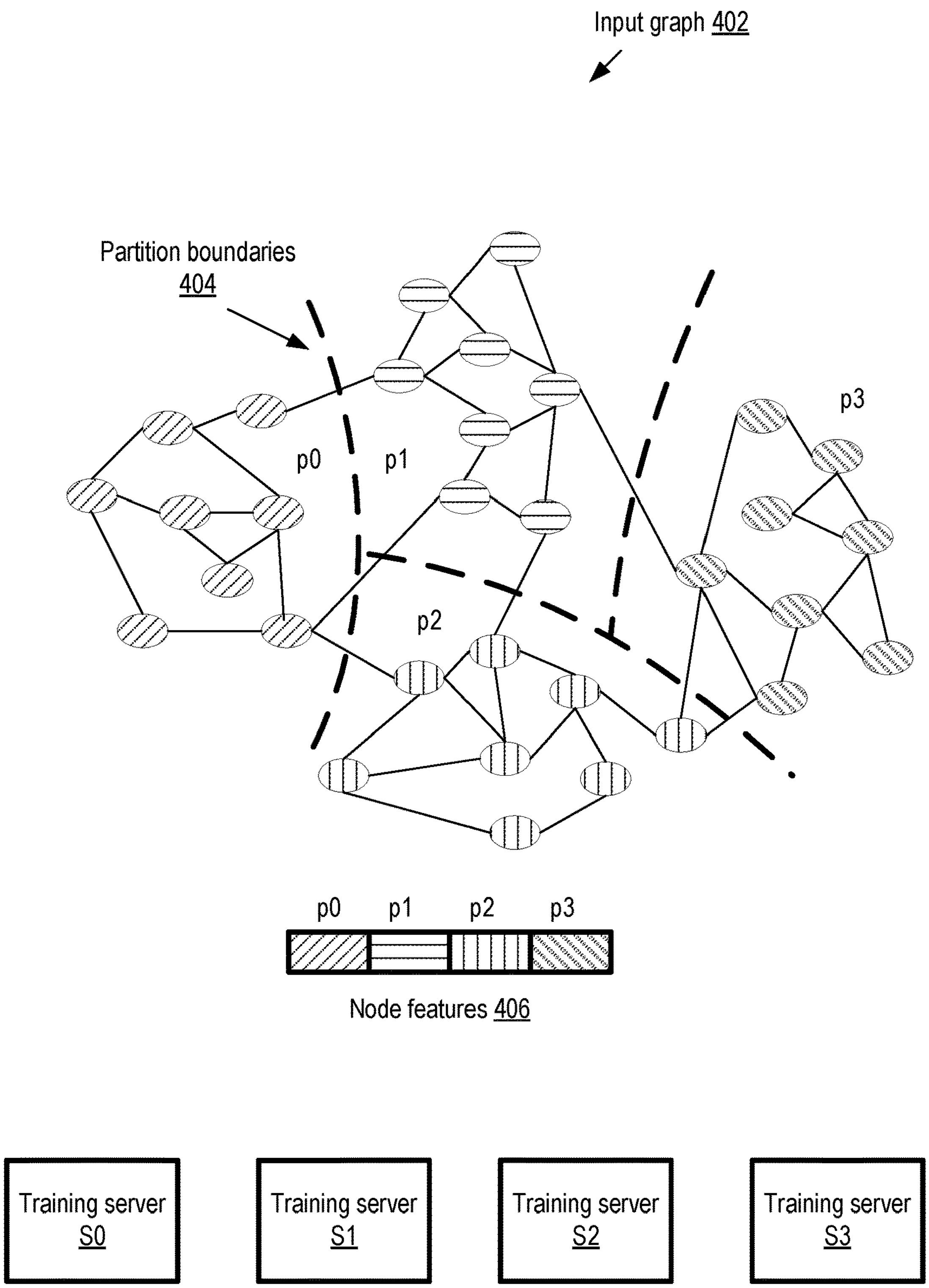
FIG. 4 and FIG. 5 collectively illustrate partitioning of a graph data set for training a model using a collection of four training servers, according to at least some embodiments.
Figure 5:
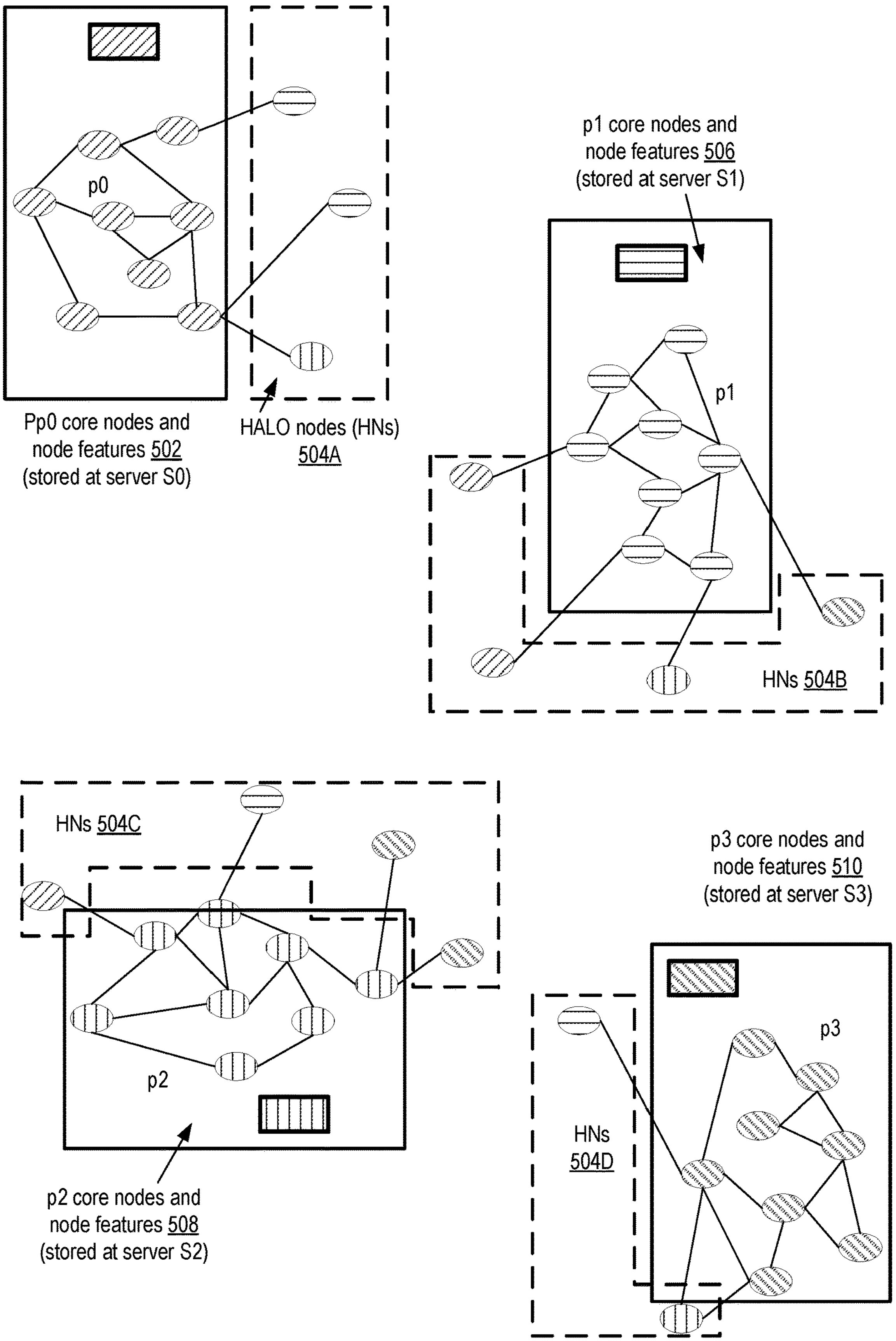

In various embodiments, as indicated above, a graph data set may first be subdivided into partitions which are stored at respective servers of a resource set used for training a model, and then individual partitions may be sampled for mini-batch training iterations. FIG. 4 and FIG. 5 collectively illustrate a partitioning of a graph data set for training a model using a collection of four training servers, according to at least some embodiments. The input graph 402 of the data set comprises 32 nodes depicted as small ovals in FIG. 4. In addition to a representation of the graph structure (which indicates the edges that link the nodes), additional metadata comprising node features 406 may also be included in the graph data set. The graph data set is to be split among four training servers S0, S1, S2 and S3 in the depicted example scenario.

In some embodiments, a multi-constraint partitioning algorithm (e.g., an extension of algorithms used in METIS) may be employed to subdivide an input graph such as graph 402 such that one partition is identified for each training server available. The partitioning may be described as being multi-constraint in that it attempts to achieve parity or balance among the partitions with respect to multiple properties such as the total number of nodes per partition, the total number of labeled nodes per partition (in scenarios in which some nodes of the original graph are unlabeled while others are labeled), the total number of nodes of each type per partition (in scenarios in which each node has an associated type), the total number of edges per partition, the total number of labeled edges per partition (in scenarios in which some edges of the original graph are unlabeled while others are labeled), the total number of edges of each type per partition (in scenarios in which each edge has an associated type), and so on.

In the example scenario of FIG. 4 and FIG. 5, the nodes of the input graph 402 are first subdivided into four groups corresponding to partitions p0, p1, p2 and p3. Partition boundaries 404 are shown using dashed lines, and membership of nodes in the partitions is indicated by shading of the nodes. Densely connected nodes are assigned as far as possible to the same partition to reduce the number of edge cuts between partitions. Each of the four partitions is initially assigned 8 nodes of the 32 nodes of the input graph, thus satisfying the constraint that each partition should contain at least roughly the same number of nodes. To simplify the presentation, constraints other than the total-node-count-per-partition balancing constraint are not illustrated in FIG. 4 and FIG. 5. The initially-assigned nodes are referred to as core nodes of the partitions. Each node of the input graph is designated as a core node of exactly one partition in the partitioning algorithm whose results are displayed in FIG. 5. Along with the nodes themselves, the corresponding node features are also distributed among the partitions. FIG. 5 shows the core nodes and node features of the four partitions: p0 core nodes and node features 502 stored at training server S0, p1 core nodes and node features 506 stored at training server S1, p2 core nodes and node features 508 stored at training server S2, and p3 core nodes and node features 510 stored at training server S3.

After all the nodes have been assigned to partitions as core nodes, incident edges of the nodes of a given partition may also be assigned to the same partition in the depicted embodiment. This ensures that neighbors of a given node are accessible in the local partition, without requiring communication between servers. With this partitioning strategy, some nodes (which are core nodes of partitions stored at remote servers and are thus examples of remote nodes) and edges may be duplicated because some edges cross partition boundaries. Such duplicated nodes can be referred to as "HALO" nodes. The HALO nodes (HNs) corresponding to each of the partitions are shown in FIG. 5: HNs 504A of partition p0, HNs 504B of partition p1, HNs 504C of partition p2, and HNs 504D of partition p3.

According to some embodiments, two sets of node identifiers and edge identifiers may be maintained by an MLS similar to MLS 102 of FIG. 1. Global node IDs and edge IDs may be exposed to (and in some cases determined by) MLS clients. Internally at the MLS, local node IDs and edge IDs may be employed to locate the nodes and edges of a partition efficiently. To save memory for maintaining the mappings between global and local IDs, node IDs and edge IDs may be relabeled during the graph partitioning process such that all IDs of core nodes and edges within a given partition fall into a contiguous range of IDs. As a result of this relabeling, mapping a global ID to a partition requires only a binary lookup in a small array (with array size equal to the number of partitions), while mapping a global ID to a local ID requires a simple subtraction operation.

Figure 6:
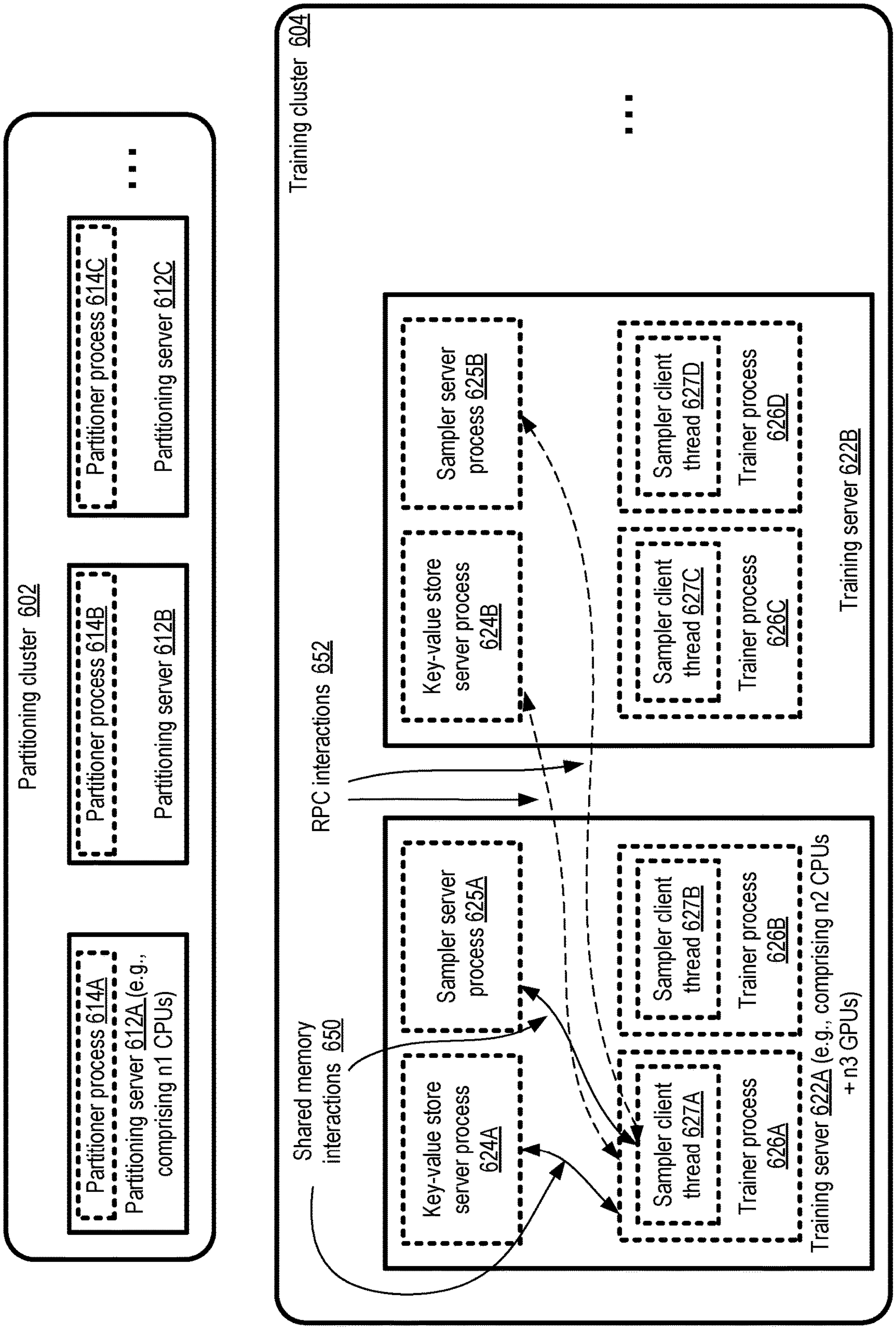
FIG. 6 illustrates an example partitioning cluster and examples of interactions between software components of a training cluster for graph models, according to at least some embodiments.

As mentioned earlier, in some embodiments different sets of resources may be employed for running the partitioning algorithm on a graph data set and for training a graph-based model. FIG. 6 illustrates an example partitioning cluster and examples of interactions between software components of a training cluster for graph models, according to at least some embodiments. Partitioning cluster 602 comprises three partitioning servers 612A, 612B and 612C in the depicted embodiment, each of which comprise n1 CPUs. One or more partitioner processes 614 (software processes comprising one or more threads of execution) may be launched at each of the partitioning servers in the depicted embodiment: for example, partitioner process 614A runs at partitioning server 612A, partitioner process 614B runs at partitioning server 612B, and partitioner process 614C runs at partitioning server 612C. The partitioning algorithm may involve several steps, including coarsening large graphs (in which multiple nodes of the graph are in effect combined into a single node), partitioning the coarsened graphs, and refinement of the partitioned coarse graphs in some embodiments. For some graphs which exhibit power-law degree distribution, successively coarser graphs may become progressively denser, which can increase the memory requirements for the partitioning algorithm. To overcome this type of problem, some edges may be dropped during the coarsening operations in some embodiments, so that the degree of each node in a coarse graph is the average degree of that node's constituent nodes. In some implementations, edges with higher weights may be retained in the coarsened version of a graph, while edges with lower weights may be dropped. At least some of the partitioner processes may run in parallel in some embodiments to perform various sub-tasks of the partitioning algorithm.

Training cluster 604 comprises at least two training servers 622A and 622B in the depicted embodiment. Each training server 622 comprises n2 CPUs and n3 GPUs. At a given training server, a set of software processes including one or more trainer processes, a key-value store server process, and a sampler server process may be run in some embodiments. For example, trainer process 626A, trainer process 626B, key-value store server process 624A, and sampler server process 625A may run at training server 622A, while trainer process 626C, trainer process 626D, key-value store server process 624B, and sampler server process 625B may run at training server 622B. Each trainer process may be responsible for training using samples from the locally-stored partition. The number of trainer processes run at a given training server may be considered a hyper-parameter in various embodiments, whose value may be selected by the client on whose behalf the graph model is to be trained, or by the MLS at which the model is trained. In one embodiment, the number of trainer processes run concurrently at a training server may be based on the number of CPUs or GPUs available at the server in some embodiments—e.g., one trainer process per CPU or per GPU available at the server may be run in one embodiment.

In at least some embodiments, each of the trainer processes at a given training server may be assigned an approximately equal number of labeled graph nodes (and/or labeled graph edges) from which samples are extracted, so that the training workload is kept balanced among the different trainer processes. In the embodiment shown in FIG. 6, each trainer process may comprise one or more sampler client threads which request the samples from a local sampler server process. For example, trainer process 626A comprises sampler client thread 627A, trainer process 626B comprises sampler client thread 627B, trainer process 626C comprises sampler client thread 627C, and trainer process 626D comprises sampler client thread 627D. Shared memory interactions 650 may be used for communications between a sampler server process 625 and a sampler client thread 627 at a given server in some embodiments, during which the sampler client submits requests for sampling the local graph partition to the sampler server process and receives a sampled mini-batch in response. Shared memory interactions may also be used for communication between a trainer process 626 and a local key-value store server process 624, during which the trainer process submits requests for features corresponding to a sampled mini-batch and receives the requested features. In some cases, e.g., for retrieving features and/or other data associated with remote nodes of the kind discussed above (e.g., the HNs shown in FIG. 5), RPC (remote procedure calls) interactions 652 may be employed. In embodiments in which the partitioning algorithm attempts to minimize the number of edge cuts during partitioning, the number of remote nodes may be much smaller than the number of core nodes, so the number of RPC interactions 652 may be much smaller than the number of shared memory interactions. Note that while arrows representing interactions via shared memory and RPC are only shown with respect to trainer process 626A and its sampler client thread 627A in FIG. 6, other trainer processes and sampler client threads may participate in corresponding interactions via shared memory and via RPC as well in various embodiments.

As indicated in FIG. 6, both multithreading and multiprocessing may be employed in some embodiments to speed up model training—e.g., multiple trainer processes may be run at a given training server to ensure that as many GPU-based mini-batch computations are run in parallel as possible, and multiple sampler client threads may be run within each trainer process to parallelize sampling computations run at the CPUs of the training server (or a single sampler client thread may issue asynchronous task requests for multiple mini-batches). Note that in some embodiments, the partitioning algorithm computations may also be run at the same servers that are later used for training computations, so separate partitioning clusters and training clusters may not be required. The total number of servers included in a given partitioning cluster or a given training cluster may vary in different embodiments. In some embodiments, for example, the client on whose behalf the model is to be trained may decide the number of servers to be used for partitioning and/or for training the model; in other embodiments, the MLS may select servers for partitioning and training based on factors such as the size of the graph data set, the number of GPUs/accelerators and CPUs available per server, and the like.

Figure 7:
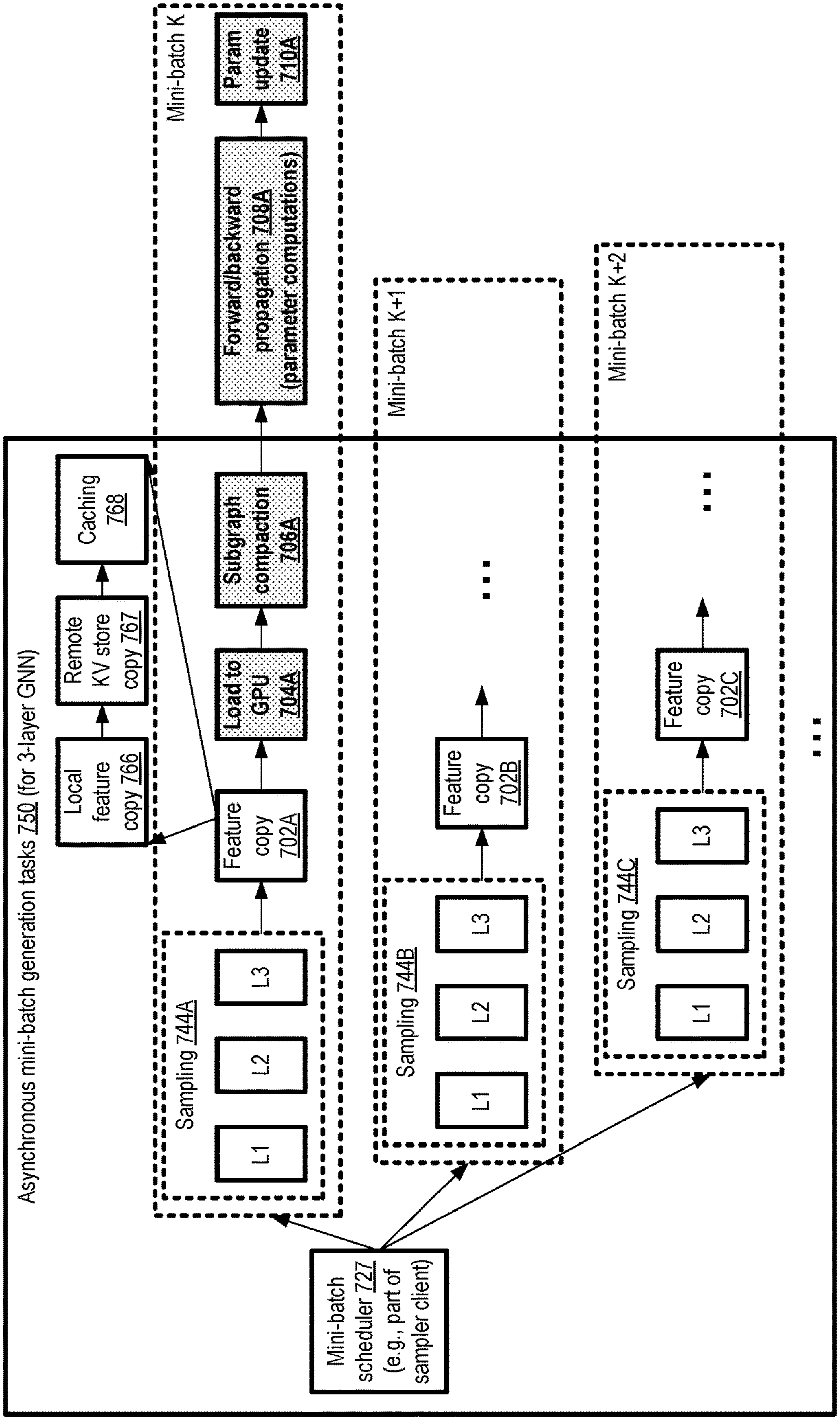
FIG. 7 illustrates examples of asynchronous tasks that may be scheduled for mini-batch based training of a model using CPUs and GPUs at a particular server, according to at least some embodiments.

As mentioned earlier, pipelines of asynchronous sub-tasks may be executed for respective mini-batch based training iterations in various embodiments. FIG. 7 illustrates examples of asynchronous tasks that may be scheduled for mini-batch based training of a model using CPUs and GPUs at a particular server, according to at least some embodiments. In the example scenario shown in FIG. 7, the model to be trained is assumed to be a 3-layer GNN model. A respective pipeline of asynchronous tasks that may be scheduled by a mini-batch scheduler 727 (which may be implemented as part of a trainer process of the kind shown in FIG. 6) and performed for each of three mini-batches (mini-batch K, mini-batch K+1, and mini-batch K+2) is shown. The tasks may be divided into two broad categories—tasks to generate the mini-batches (i.e., to identify the nodes/edges of each mini-batch and obtain corresponding features), followed by the learning and updating of model parameters.

The asynchronous mini-batch generation tasks 750 may include sampling tasks for the layers of the GNN (such as sampling tasks 744A for mini-batch K, with L1, L2 and L3 indicating respective sampling tasks for each layer), feature copy tasks (such as feature copy tasks 702A for mini-batch K), tasks to load data onto memory accessible from a GPU (such as load to GPU task 704A for mini-batch K), and sub-graph compaction tasks (such as sub-graph compaction 706A, in which aliases which make subsequent computations more efficient may be generated from the identifiers of the sampled graph nodes). At a GPU, once the sub-graph data and features have been loaded and the sub-graph has been compacted, forward/backward propagation tasks such as task 708A may be executed to compute changes to model parameters, and a parameter update task (such as param update 710A) may be performed to update the parameter values learned during via the forward/backward propagation. The asynchronous tasks that are shaded (such as tasks 704A, 706A, 708A and 710A) may be performed at least in part using a GPU of the training server in some embodiments, while the unshaded tasks (such as sampling tasks 744A and feature copy tasks 702A in the case of mini-batch K) may be performed primarily using the CPUs of the training server. For each mini-batch, a similar sequence of asynchronous tasks may be performed in various embodiments; to avoid clutter, not all the tasks of all three mini-batches are shown in FIG. 7. Thus, only the first few tasks of each min-batch pipeline (sampling tasks 744B and feature copy tasks 702B in the case of mini-batch K+1, and sampling tasks 744C and feature copy tasks 702C in the case of mini-batch K+2) are shown.

Feature copy tasks such as 702A, 702B or 702C may in turn be split up into at least three smaller sub-tasks in some embodiments, as indicated in FIG. 7 for mini-batch K. These sub-tasks may include a local feature copy task 766, a remote KV (key-value) store copy task 767, and a CPU caching task 768. Features for the sampled nodes (identified in the sampling tasks 744A) which are core nodes of the local partition may be read (e.g., via shared memory as discussed in the context of FIG. 6) from the local key-value store in the local feature copy task 766. If any of the sampled nodes are core nodes of remote partitions, their features may be read (e.g., via RPC as also discussed in the context of FIG. 6) from a remote instance of a key-value store, located at a different training server, as part of a remote KV store copy task 767. Since it may sometimes be the case that the same node is sampled for multiple mini-batches, the retrieved features obtained from the remote KV stores may be cached locally as part of caching task 768. Similar sub-tasks for feature copying may be performed for each mini-batch in at least some embodiments.

Requests for various types of the tasks illustrated in FIG. 6 may be submitted, for example by the sampler client thread to some or all of the local and remote server processes of the kind shown in FIG. 6, such as a key-value store instance server or a local sampler server. In some embodiments, one or more additional threads of a trainer process (threads other than the sampler client thread), referred to as background threads may be used the local feature copy tasks using shared memory operations. After submitting an asynchronous task request, the requester of the task (e.g., the sampler client thread) may wait for a notification that the task has been completed, and may, submit tasks of other mini-batches or respond to task completions of other mini-batches. The requested tasks may be queued at the targeted server, and a notification of task completion may be sent to the requester. While data dependencies may exist between successive tasks of a given mini-batch pipeline (e.g., L2 sampling may require the results of the L1 sampling to be known), no such dependencies may exist between tasks of different pipelines. As such, tasks of multiple pipelines may be performed at least partly in parallel in some embodiments—for example, during a portion of the time in which a feature copy task for mini-batch K is being run, a sampling task may be performed concurrently for mini-batch K+1, and so on. As the number of concurrent pipelines is increased, the amount of memory consumed at the server may also increase in at least some embodiments. The total number of mini-batch pipelines to be executed at least partly concurrently at a given training server may represent another hyperparameter of the model training process. The value of this hyper-parameter being indicated by the MLS client or automatically selected by the MLS; in some embodiments, the MLS may try out a few different values of the mini-batch concurrency hyperparameter, measure the utilization of the memory, CPUs and GPUs/accelerators, and adjust the hyperparameter value based on the measurements so as to achieve a targeted range of utilization levels.

In some implementations, code corresponding to the following pseudo-code may be employed for each of the mini-batches, with the "to_block" function representing the sub-graph compaction task.

```
----Start mini-batch sampling pseudo-code ---------------
  def sample_neighbors(g, seeds, fanouts):
    frontiers [ ]
    for i, fanout in enumerate(fanouts):
      #Sample neighbors from seed nodes
      frontier=dgl.sample_neighbors(g, seeds, fanout)
      #Seed nodes for the next layer.
      src, dst=frontier.edges( )
      seeds=unique(src)
      frontiers.append(to_block(frontier))
    return blocks
----End mini-batch sampling pseudo-code ---------------
```

In at least some embodiments, aliasing or identifier substitutions for graph nodes/edges may be performed at several different stages of the model training procedure. The original identifiers of the nodes/edges may be modified first during the partitioning of the graphs, so that it becomes possible to determine the partition to which a given node belongs based on the modified identifiers. The range of identifiers used within a given partition may overlap with the range of identifiers used within a different partition to save storage space—e.g., if a million nodes are stored in a partition p0 and another million nodes are stored in partition p1, the within-partition identifiers may be set to 0 to 999,999 for the nodes in partition p0, and also to 0 to 999,999 for the nodes in partition p1. Subsequently, after sampling the partitions for the mini-batches, additional aliasing may be performed for the nodes within each mini-batch as part of sub-graph compaction, to make it even more efficient to process the mini-batches in some embodiments.

In some embodiments, after the mini-batch training iterations are completed, asynchronous task pipelines similar to the pipeline shown in FIG. 7 may also be employed during inference using the trained model. For example, sampling tasks, feature copy tasks, load to GPU tasks, and subgraph compaction tasks and forward propagation tasks may be performed asynchronously during inference, using CPUs and GPUs for different types of tasks in the manner discussed above. Backward propagation and model parameter update tasks may not be required during inference in such embodiments, since the model has already been trained. In some cases, the server(s) used for inference may include some server(s) used for model training, while in other cases a different set of servers may be used for training than for inference.

Figure 8:
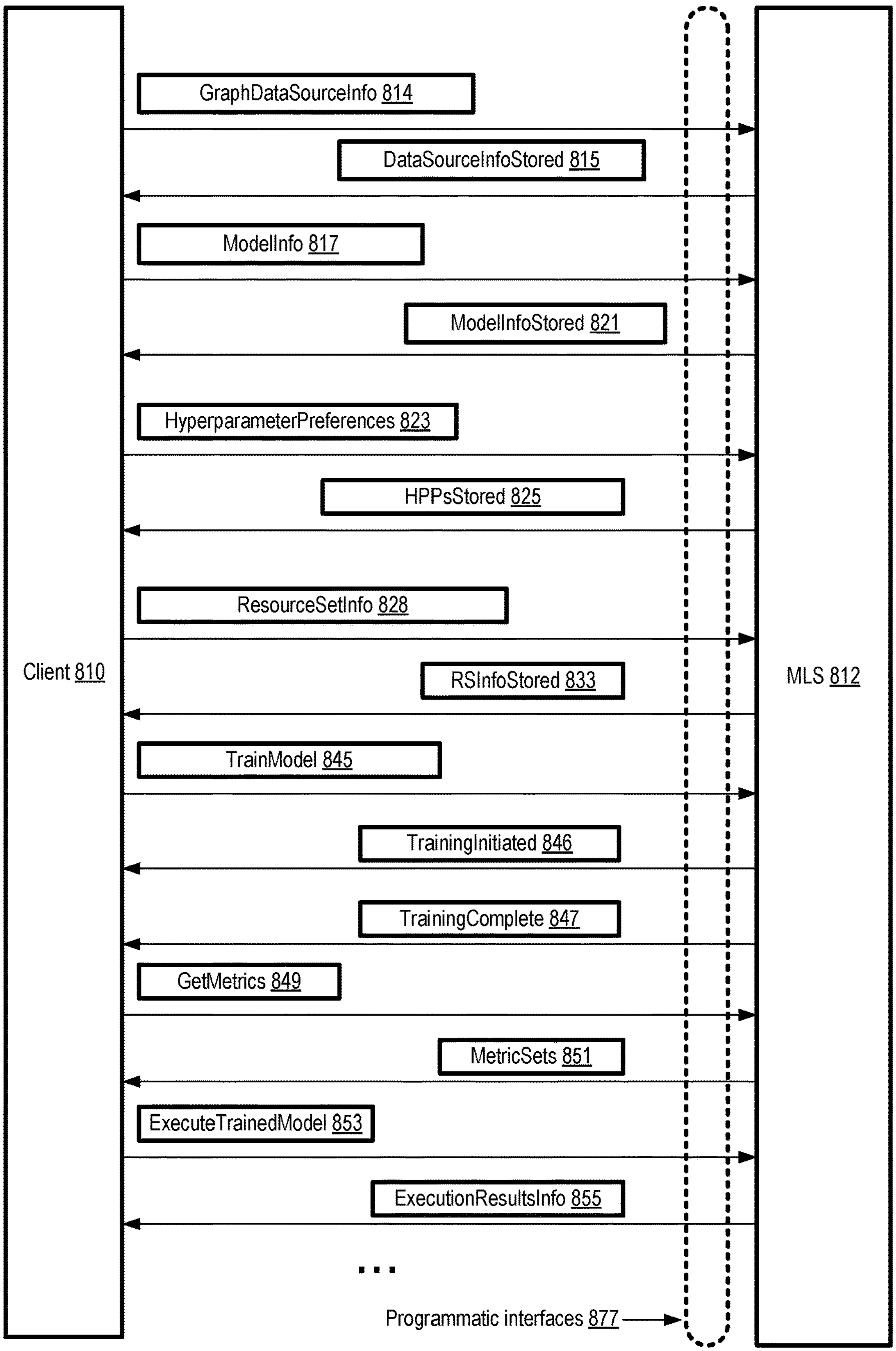
FIG. 8 illustrates example programmatic interactions associated with the training of machine learning models for large graph data sets, according to at least some embodiments.

FIG. 8 illustrates example programmatic interactions associated with the training of machine learning models for large graph data sets, according to at least some embodiments. An MLS 812 similar in functionality to MLS 102 of FIG. 1 may implement a set of programmatic interfaces 877 in the depicted embodiment, such as one or more web-based consoles, command-line tools, application programming interfaces (APIs), graphical user interfaces and the like.

An MLS client 810 may use the programmatic interfaces to submit a GraphDataSourceInfo message 814, indicating one or more data sources from which a graph data set to be used to train a model may be obtained. The MLS 812 may store the information provided about the data source, and send a DataSourceInfoStored message 815 to the client. Information about the problem to be solved using the model, the kinds of inferences desired (e.g., node classification, edge prediction, graph classification, etc.), and/or the type of model (e.g., whether a GNN is to be used or some other type of graph model is to be used) and the like may be provided by the client via a ModelInfo message 817 in some embodiments. The model information may be saved at the MLS 812, and a ModelInfoStored message 821 may be sent to the client in some embodiments.

Some MLS clients may provide preferred values or preferred ranges of hyperparameters to be used during model training, e.g., via one or more HyperparameterPreferences messages 823. For example, clients may specify a learning algorithm, a loss function, training completion criteria (e.g., a desired level of prediction accuracy or a targeted deadline for training the model), the number of layers of a neural network such as a GNN to be used for the model, a partitioning algorithm to be used to subdivide the graph into partitions, constraints to be used during the partitioning, and/or an indication of a maximum number of mini-batch training iterations to be initiated in parallel at a given resource. The hyperparameter preferences may be stored at the MLS and an HPPsStored message 825 may be sent to the client in the depicted embodiment.

A client 610 may use a ResourceSetInfo message 828 to provide an indication of the resource set (e.g., virtual or physical servers with some number of CPUs, at least of which may comprise or provide access to accelerators such as GPUs for machine learning tasks) that can be used for training the model in the depicted embodiment. In some embodiments, the client may indicate different resource sets to be used for data set partitioning versus model training. In at least one embodiment, the resource set(s) may include virtual machines or compute instances of a computing service of a provider network. The resource set information may be saved at the MLS, and an RSInfoStored message 833 may be sent to the client in some embodiments. In some cases, the ResourceSetInfo message 828 may not specify specific servers as such, and may instead provide an indication of a total resource budget and/or a total time budget, and the MLS may select specific servers based on the budget(s).

A TrainModel request 845 may be submitted by the client 810 in various embodiments to request the training of the desired model. In some embodiments, some or all of the information described above as being provided in the GraphDatSourceInfo message, the ModelInfo message, the HyperparameterPreferences messages, and/or the ResourceSetInfo message may be included instead in the TrainModel request message. The MLS may start the operations needed to train the model (e.g., including partitioning of the graph data set followed by launching of asynchronous pipelines for mini-batch training), and send a TrainingInitiated message 846 to the client in one embodiment. After the training is terminated, e.g., either because the model has reached its goal prediction accuracy or because the time or resource budget has been exhausted), in some embodiments the MLS may store a trained version of the model and send a TrainingComplete message 847 to the client. In at least one embodiment, one or more model quality metrics of the trained model (such as prediction accuracy with respect to a test subset of the data set) may be provided to the client as well.

In at least one embodiment, the client may submit a GetMetrics request 849 to obtain metrics collected during the data set partitioning and/or model training operations. In response, the MLS may use one or more MetricsSets messages 851 to provide metrics such as the average (and/or maximum) utilizations of CPUs/GPUs/accelerators, memory, storage, networking devices etc. of the resource set(s) employed, the total number of mini-batch training iterations conducted, the number of remote procedure calls (RPCs) invoked, and so on.

Depending on the type of model and the characteristics of the graph data set, the trained model may be executed in different ways at the MLS 812. In some cases, in which the input graph comprises both labeled and unlabeled nodes/edges, the objective of training the model may comprise providing predictions for the unlabeled nodes and/or edges of the same graph, and such labels may be generated automatically after the model is trained. In other cases, new nodes/edges may be added to the graph that was used to train the model, and labels for the new nodes/edges may be desired. Alternatively, entirely new graphs may be provided as input to the trained version of the model, and predictions for the nodes/edges of the new graphs, and/or graph-level predictions may be generated for the new graphs. An MLS client may submit an ExecuteTrainedModel request 853 indicating the new input (if any) for which predictions are to be generated, or indicating that the trained model is to be used to generate predictions for an unlabeled subset of the original input graph. The trained version of the model may be executed as requested at or by the MLS, and a set of results obtained may be provided or indicated to the client in one or more ExecutionResultsInfo messages 855 in various embodiments. In some embodiments, programmatic interactions related to the training of graph-based models, other than the interactions shown in FIG. 8, may be supported by an MLS 812.

Figure 9:
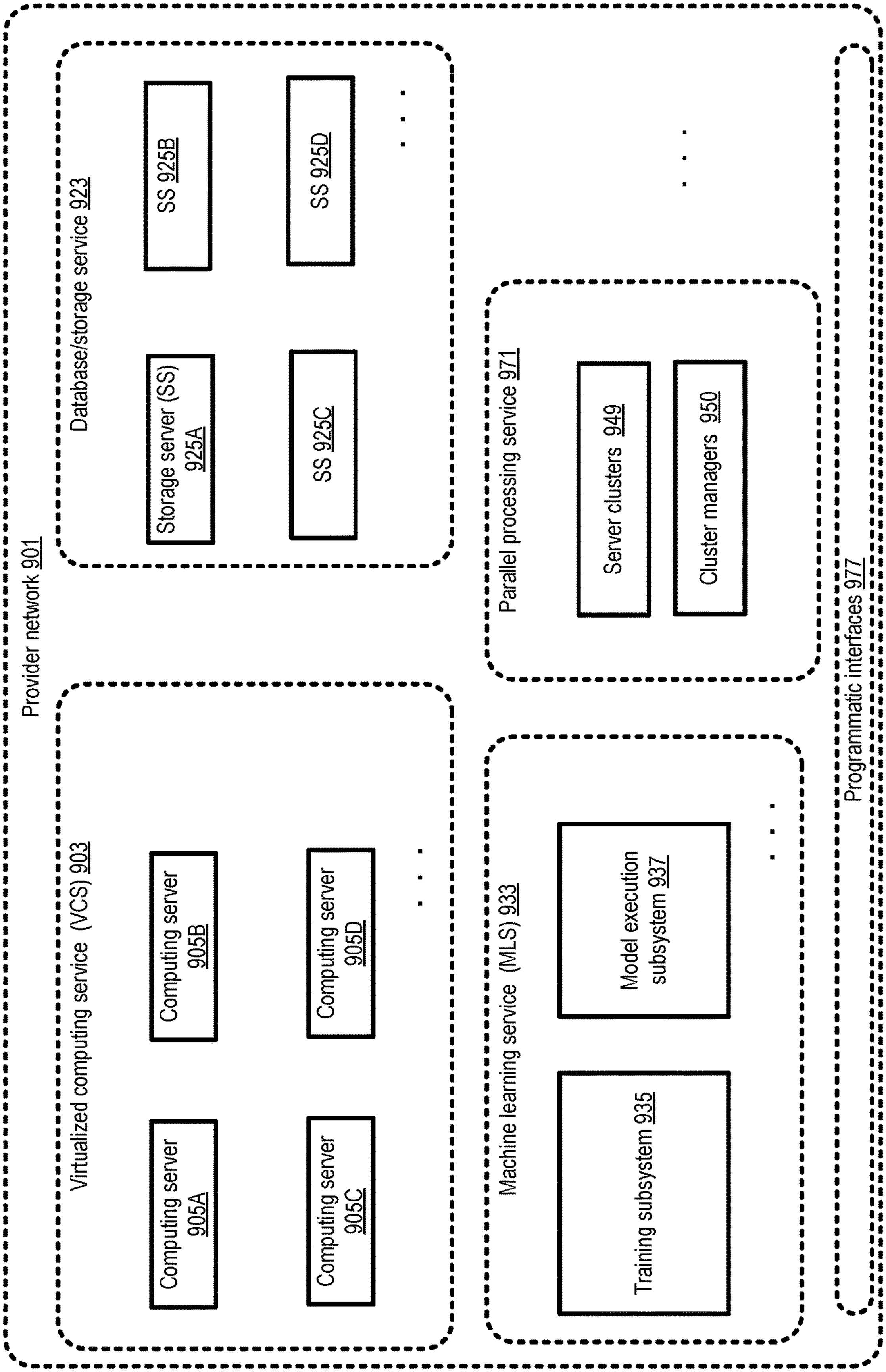
FIG. 9 illustrates an example provider network within which machine learning models for large graph data sets may be trained and executed, according to at least some embodiments.

FIG. 9 illustrates an example provider network within which machine learning models for large graph data sets may be trained and executed, according to at least some embodiments. In the depicted embodiment, provider network 901 may comprise resources used to implement a plurality of services, including for example a virtualized computing service (VCS) 903, a database/storage service 923, a parallel processing service 971 as well as an MLS 933. The MLS 933, similar in features and functionality to MLS 102 of FIG. 1, may comprise a training subsystem 935 and a model execution subsystem 937. In some embodiments a separate model training service may be implemented at a provider network instead of using a subsystem within a more general MLS.

Components of a given service of a provider network may utilize components of other services in the depicted embodiment—e.g., for some tasks such as partitioning of large graph data sets and training of graph-based models using asynchronous mini-batch pipelines of the kind discussed above, virtual machines implemented at computing servers such as 905A-905D of the virtualized computing service 903 may be used by the MLS, the graph data sets as well as model execution results may be stored at storage servers 925 (e.g., 925A-925D) of storage service 923, and so on. For some types of machine learning tasks initiated at the MLS 933, server clusters 949 may be utilized with the help of cluster managers 950. Individual ones of the services shown in FIG. 9 may implement a respective set of programmatic interfaces 977 which can be used by external and/or internal clients (where the internal clients may comprise components of other services) in the depicted embodiment.

Figure 10:
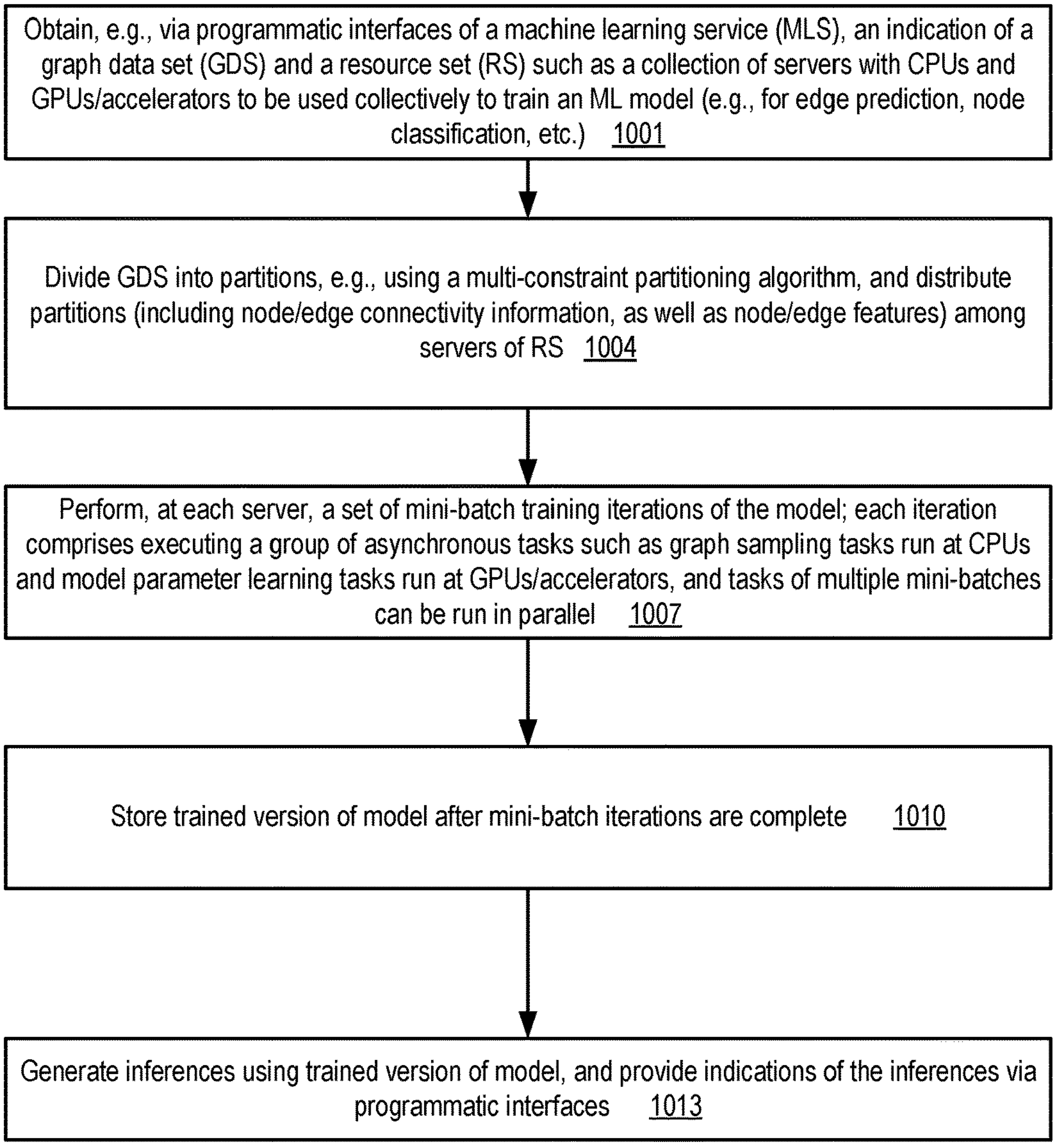
FIG. 10 is a flow diagram illustrating aspects of operations which may be performed to train and use machine learning models for large graph data sets, according to at least some embodiments.

FIG. 10 is a flow diagram illustrating aspects of operations which may be performed to train and use machine learning models for large graph data sets, according to at least some embodiments. As shown in element 1001, an indication of a graph data set (GDS) and a resource set (RS) to be used collectively to train a machine learning model may be obtained via programmatic interfaces of a machine learning service (MLS). The resource set may comprise multiple servers, with each server comprising some number of CPUs and some number of GPUs or other training accelerator devices. The machine learning model may be intended to be used for any of a variety of prediction or inference tasks, such as edge prediction, node classification, graph or sub-graph classification, and the like, in problem domains such as recommendation generation, search, fraud detection and the like.

The GDS may be divided into partitions in the depicted embodiment, e.g., using a multi-constraint partitioning algorithm which tries to balance partitions based on factors such as the total number of nodes/edges per partition, the total number of labeled nodes/edges per partition, the total number of nodes/edges of each type (in scenarios in which there can be nodes/edges of different types), and so on (element 1004). The partitions of the graph, along with metadata such as node/edge features which may be stored in key-value stores at each server of the RS separately from the structural information of the graph, may be distributed among the servers in some embodiments.

At each of the servers of the RS, a set of mini-batch training iterations may be performed (element 1007) in various embodiments. Each iteration may comprise executing a group of asynchronous tasks, such as partition subgraph sampling tasks run at CPUs, model parameter learning tasks run at GPUs, and so on. Tasks from different min-batch iterations may be run at least partly in parallel in some embodiments, thus making use of multiple computing and networking resources in parallel.

A trained version of the model, obtained after all the mini-batch iterations are completed, may be stored at the MLS (element 1010). Inferences or predictions may then be generated using the trained version of the model, and indications of the inferences/predictions may be provided via the programmatic interfaces of the MLS (element 1013).

It is noted that in various embodiments, some of the operations shown in the flow diagram of FIG. 10 may be implemented in a different order than that shown in the figure, or may be performed in parallel rather than sequentially. Additionally, some of the operations shown in FIG. 10 may not be required in one or more implementations.

Figure 11:
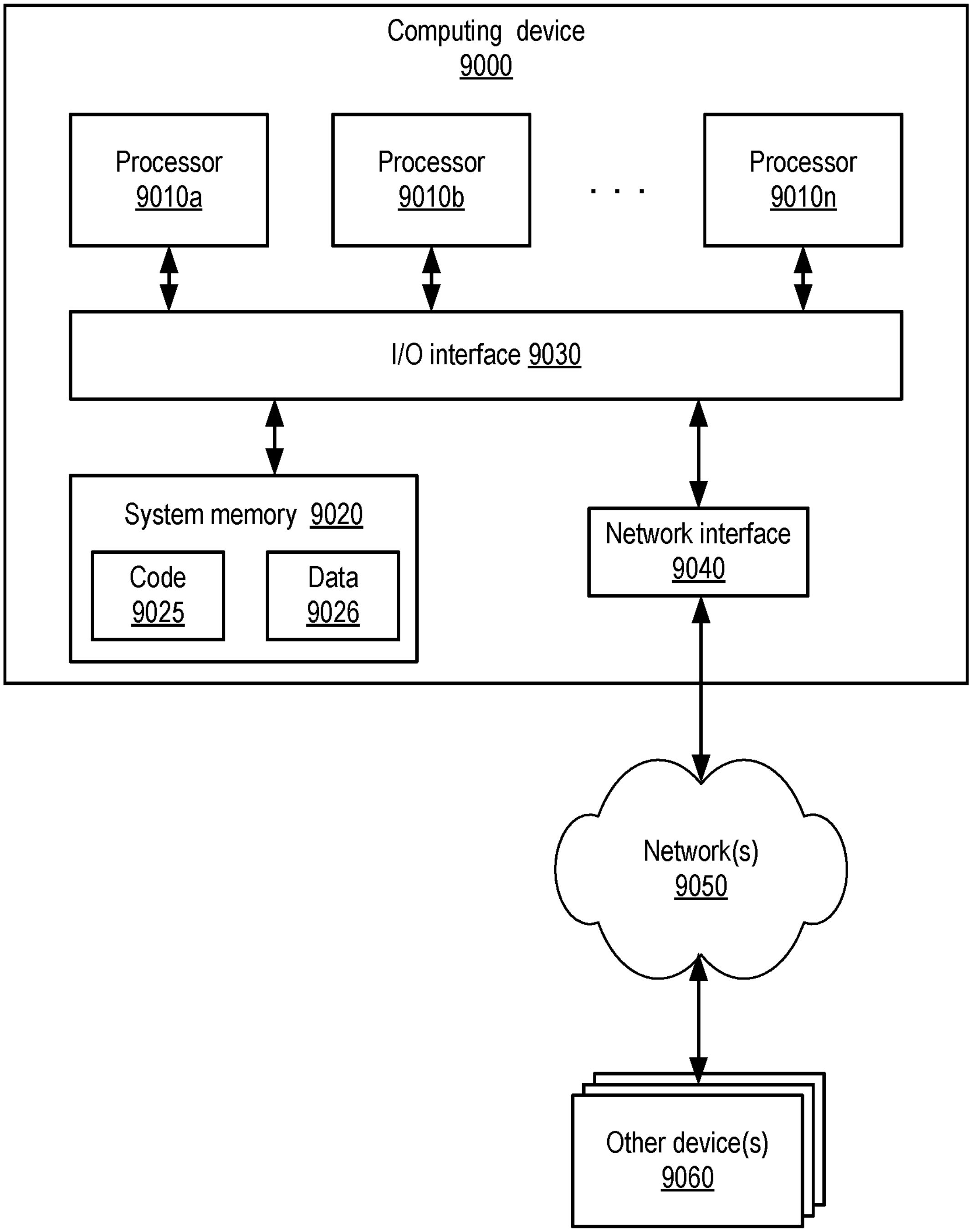
FIG. 11 is a block diagram illustrating an example computing device that may be used in at least some embodiments.

In at least some embodiments, a server that implements the types of techniques described herein (e.g., various functions of an MLS, a VCS and other services of a provider network), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) and/or other types of computation accelerators may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices:

obtain, at a machine learning service of a provider network via one or more programmatic interfaces, an indication of (a) a resource set for training a model, wherein the resource set comprises a plurality of servers, wherein individual ones of the servers comprise one or more central processing units (CPUs) and one or more graphics processing units (GPUs) and (b) a data set of which at least a portion is to be used as training input for the model, wherein the data set comprises a graph with a plurality of nodes and a plurality of edges, wherein individual nodes represent respective entities, and wherein an edge connecting a first node to a second node represents a relationship between the first node and the second node;

store, at a particular server of the plurality of servers, a first partition of the data set obtained by applying a multi-constraint partitioning algorithm to the data set;

perform, at the particular server using at least a portion of the first partition of the data set stored at the particular server, a plurality of mini-batch training iterations to train the model, wherein a particular mini-batch training iteration of the plurality of mini-batch training iterations comprises executing a group of asynchronous tasks including (a) a graph sampling task run at least in part on a CPU of the particular server, wherein the graph sampling task comprises sampling a subset of nodes of the first partition of the data set and (b) a model parameter learning task run at least in part on a GPU of the particular server, wherein the model parameter learning task executed on the GPU of the particular server of the plurality of servers is performed using the subset of nodes of the first partition of the data set subsequent to execution of the graph sampling task by the CPU of the particular server of the plurality of servers to sample the subset of nodes of the first partition of the data set, and wherein the model parameter learning task of the particular mini-batch training iteration of the plurality of mini-batch training iterations is executed by the GPU of the particular server using the previously sampled subset of nodes of the first partition of the data set to train the model at least partly in parallel with a graph sampling task of another mini-batch training iteration of the plurality of mini-batch training iterations executed by the CPU of the particular server to sample a different subset of nodes of the first partition of the data set; and provide, via the one or more programmatic interfaces of the machine learning service, an indication of an inference obtained from a trained version of the model, wherein the trained version of the model is obtained after the plurality of mini-batch training iterations is completed.

2. The system as recited in claim 1, wherein the particular server comprises a compute instance of a virtualized computing service of the provider network.

3. The system as recited in claim 1, wherein the model comprises a graph neural network with a plurality of layers including a first layer and a second layer, and wherein the group of asynchronous tasks of the particular mini-batch training iteration comprises a first graph sampling task for the first layer and a second graph sampling task for the second layer.

4. The system as recited in claim 1, wherein the group of asynchronous tasks of the particular mini-batch training iteration includes a feature copy task comprising copying features of a subset of nodes of the graph from a first type of memory of the particular server to a second type of memory of the particular server.

5. The system as recited in claim 1, wherein to obtain the inference, at least one asynchronous task is run at a CPU, and at least one asynchronous task is run at a GPU.

6. A computer-implemented method, comprising:

obtaining, at a machine learning service of a provider network via one or more programmatic interfaces, an indication of a data set of which at least a portion is to be used as training input for a model, wherein the data set comprises a graph with a plurality of nodes and a plurality of edges, wherein individual nodes represent respective entities, and wherein an edge connecting a first node to a second node represents a relationship between the first node and the second node;

performing, at a particular server of a resource set identified for training the model, wherein the resource set comprises a plurality of servers, a plurality of mini-batch training iterations to train the model, wherein a particular mini-batch training iteration of the plurality of mini-batch training iterations comprises executing a group of asynchronous tasks including (a) a graph sampling task run at least in part on a central processing unit (CPU) of the particular server, wherein the graph sampling task comprises sampling a subset of nodes of the graph and (b) a model parameter learning task run at least in part on a training accelerator of the particular server, wherein the model parameter learning task executed on the training accelerator of the particular server of the plurality of servers is performed using the subset of nodes of the graph subsequent to execution of the sampling task by the CPU of the particular server of the plurality of servers to sample the subset of nodes of the graph, and wherein the model parameter learning task of the particular mini-batch training iteration of the plurality of mini-batch training iterations is executed by the GPU of the particular server using the previously sampled subset of nodes of the graph to train the model at least partly in parallel with a graph sampling task of another mini-batch training iteration of the plurality of mini-batch training iterations executed by the CPU of the particular server to sample a different subset of nodes of the graph; and storing a trained version of the model, wherein the trained version of the model is obtained after the plurality of mini-batch training iterations is completed.

7. The computer-implemented method as recited in claim 6, wherein the model comprises a graph neural network with a plurality of layers including a first layer and a second layer, and wherein the group of asynchronous tasks of the particular mini-batch training iteration comprises a first graph sampling task for the first layer and a second graph sampling task for the second layer.

8. The computer-implemented method as recited in claim 6, wherein the group of asynchronous tasks of the particular mini-batch training iteration includes a feature copy task comprising copying features of a subset of nodes of the graph from a first type of memory of the particular server to a second type of memory of the particular server.

9. The computer-implemented method as recited in claim 6, wherein the group of asynchronous tasks of the particular mini-batch training iteration includes a data loading task comprising loading, into a memory accessible from the training accelerator, data accessed during the model parameter learning task.

10. The computer-implemented method as recited in claim 6, wherein the group of asynchronous tasks of the particular mini-batch training iteration includes a sub-graph compaction task in which aliases are generated for one or more nodes of the graph, and wherein the sub-graph compaction task is performed at least in part at the training accelerator.

11. The computer-implemented method as recited in claim 6, wherein the group of asynchronous tasks of the particular mini-batch training iteration includes an updated parameter storing task performed at least in part at the training accelerator, and wherein in the updated parameter storing task, values of one or more model parameters updated in the model parameter learning task are stored.

12. The computer-implemented method as recited in claim 6, further comprising:

subdividing the graph into a plurality of partitions using a partitioning algorithm with a plurality of partition balance constraints, including one or more of: a total-node-count-balance constraint, a labeled-node-count-balance constraint, a node-type-balance constraint, a total-edge-count-balance constraint, an edge-type-balance constraint, or a labeled-edge-count-balance constraint; and storing, at the particular server, a first partition of the plurality of partitions, wherein the graph sampling task comprises sampling a subset of nodes of the first partition.

13. The computer-implemented method as recited in claim 6, further comprising:

obtaining, at the machine learning service via the one or more programmatic interfaces, values of one or more hyperparameters for training the model, including one or more of: (a) a learning algorithm, (b) a loss function, (c) a number of layers of a neural network used for the model, (d) a partitioning algorithm to be used to subdivide the graph into partitions, or (e) an indication of a maximum number of mini-batch training iterations to be initiated in parallel at the particular server.

14. The computer-implemented method as recited in claim 6, further comprising:

providing, by the machine learning service via the one or more programmatic interfaces, one or more metrics collected during training of the model, wherein the one or more metrics include one or more of: (a) a CPU utilization metric of the particular server, (b) a training accelerator utilization metric of the particular server, or (c) a network bandwidth usage metric indicative of traffic flow between the particular server and one or more other servers used during training of the model.

15. The computer-implemented method as recited in claim 6, wherein the model is trained at least in part using a stochastic gradient descent algorithm.

16. One or more non-transitory computer-accessible storage media storing program instructions that when executed on or across one or more processors:

obtain, at a machine learning service of a provider network via one or more programmatic interfaces, an indication of a data set of which at least a portion is to be used as training input for a model, wherein the data set comprises a graph with a plurality of nodes and a plurality of edges, wherein individual nodes represent respective entities, and wherein an edge connecting a first node to a second node represents a relationship between the first node and the second node;

cause to be performed, at a particular server of a resource set identified for training the model, a plurality of mini-batch training iterations to train the model, wherein a particular mini-batch training iteration of the plurality of mini-batch training iterations comprises executing a group of asynchronous tasks including (a) a graph sampling task run at least in part on a central processing unit (CPU) of the particular server, wherein the graph sampling task comprises sampling a subset of nodes of the graph and (b) a model parameter learning task run at least in part on a training accelerator of the particular server, wherein the model parameter learning task executed on the training accelerator of the particular server of the plurality of servers is performed using the subset of nodes of the graph subsequent to execution of the graph sampling task by the CPU of the particular server of the plurality of servers to sample the subset of nodes of the graph, and wherein the model parameter learning task of the particular mini-batch training iteration of the plurality of mini-batch training iterations is executed by the GPU of the particular server using the previously sampled subset of nodes of the graph to train the model at least partly in parallel with a graph sampling task of another mini-batch training iteration of the plurality of mini-batch training iterations executed by the CPU of the particular server to sample a different subset of nodes of the graph; and store a trained version of the model, wherein the trained version of the model is obtained after the plurality of mini-batch training iterations is completed.

17. The one or more non-transitory computer-accessible storage media as recited in claim 16, wherein the model comprises a graph neural network with a plurality of layers including a first layer and a second layer, and wherein the group of asynchronous tasks of the particular mini-batch training iteration comprises a first graph sampling task for the first layer and a second graph sampling task for the second layer.

18. The one or more non-transitory computer-accessible storage media as recited in claim 16, wherein the group of asynchronous tasks of the particular mini-batch training iteration includes a feature copy task comprising copying features of a subset of nodes of the graph from a first type of memory of the particular server to a second type of memory of the particular server.

19. The one or more non-transitory computer-accessible storage media as recited in claim 16, wherein the group of asynchronous tasks of the particular mini-batch training iteration includes a data loading task comprising loading, into a memory accessible from the training accelerator, data accessed during the model parameter learning task.

20. The one or more non-transitory computer-accessible storage media as recited in claim 16, wherein the group of asynchronous tasks of the particular mini-batch training iteration includes a sub-graph compaction task in which aliases are generated for one or more nodes of the graph, and wherein the sub-graph compaction task is performed at least in part at the training accelerator.

* * * * *